Figure 1:
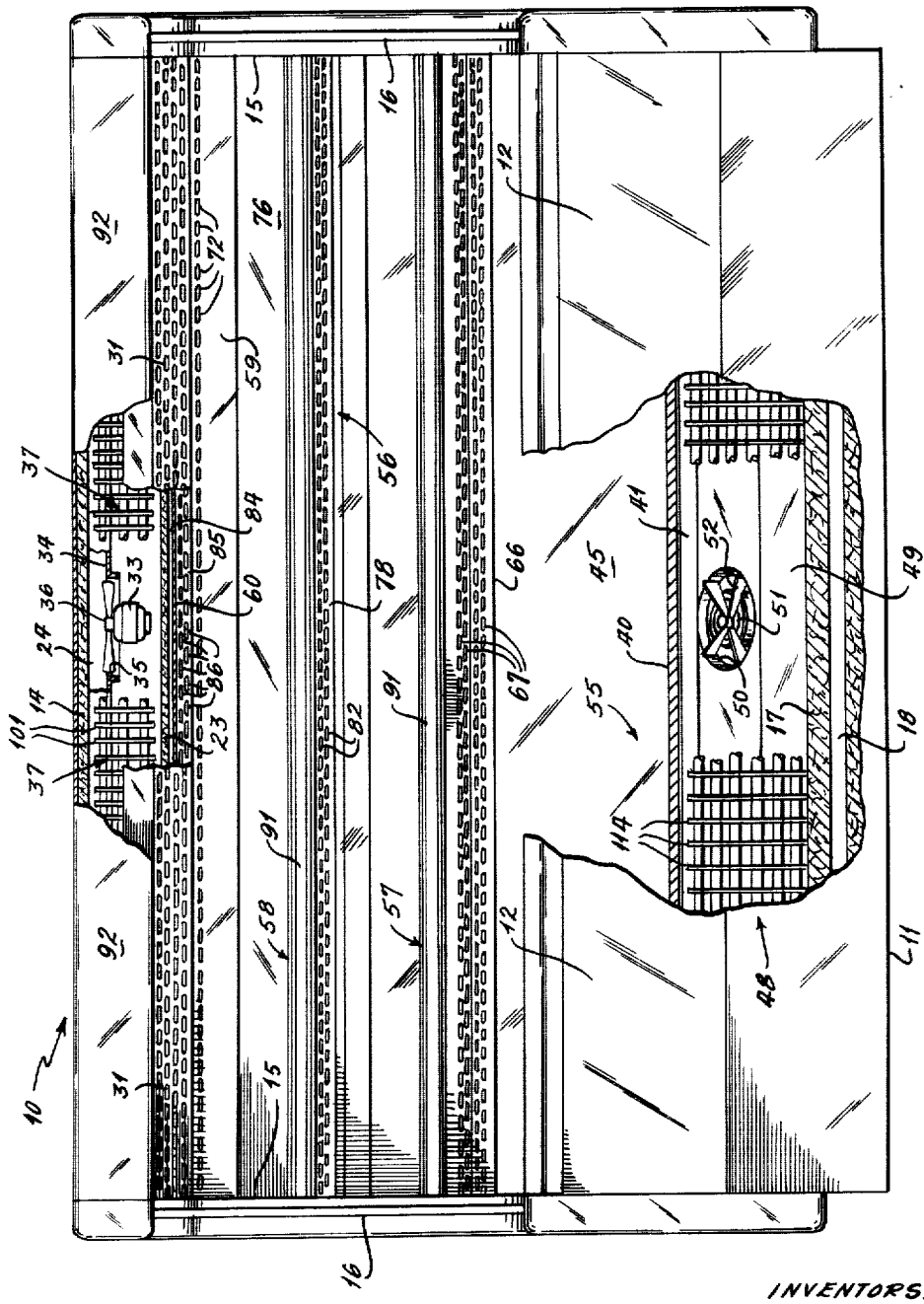

June 4, 1963   E. V. DICKSON ETAL   3,091,942
FOOD MERCHANDISER

Filed April 10, 1961   3 Sheets-Sheet 1

INVENTORS.
EDGAR V. DICKSON
THEODORE E. WEBER
BY Gravely, Lieder & Woodruff
ATTORNEYS.

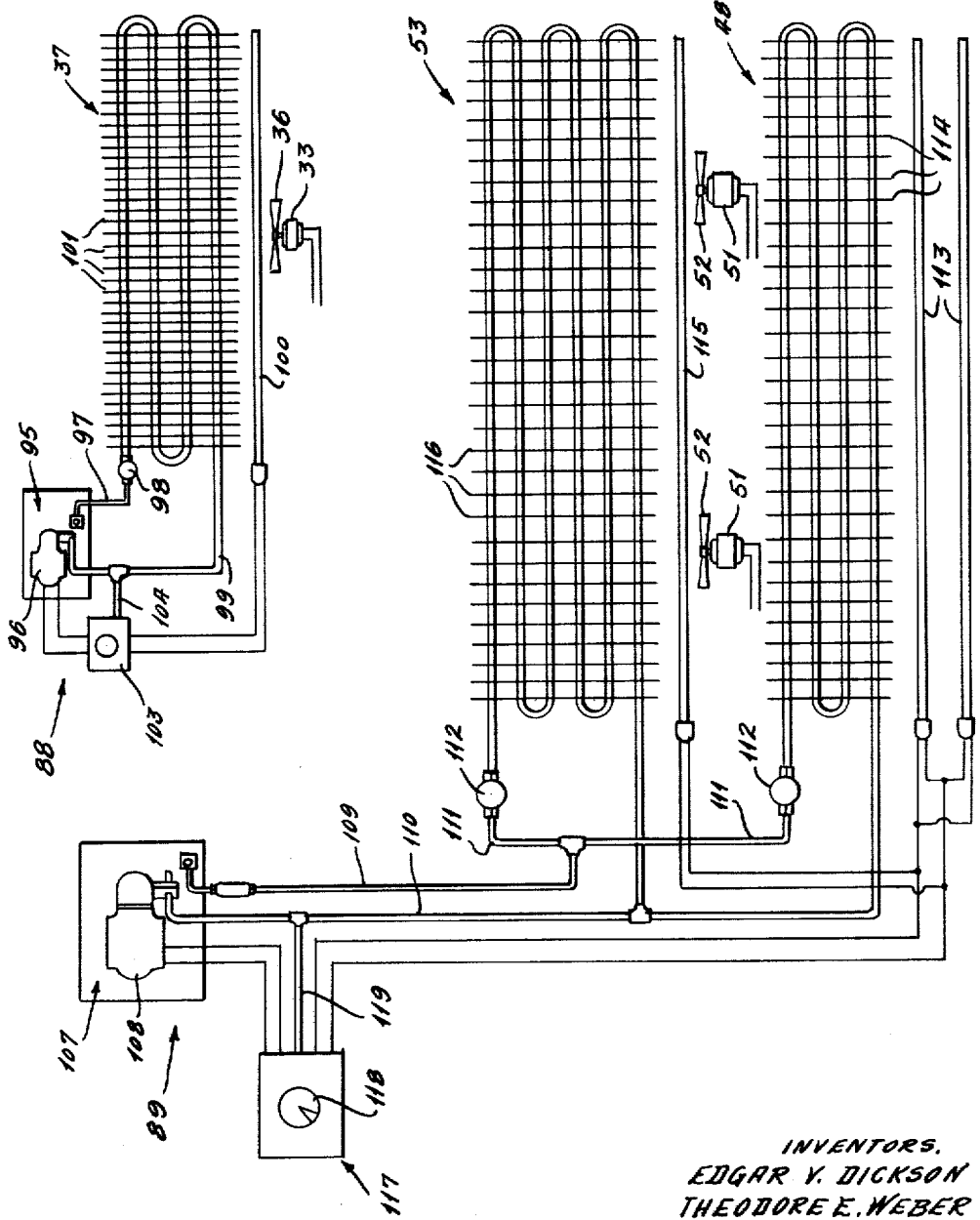

United States Patent Office 3,091,942
Patented June 4, 1963

3,091,942
FOOD MERCHANDISER
Edgar V. Dickson, Ladue, and Theodore E. Weber, Affton, Mo., assignors to Hussmann Refrigerator Co., St. Louis, Mo., a corporation of Delaware
Filed Apr. 10, 1961, Ser. No. 101,782
8 Claims. (Cl. 62—89)

This invention relates generally to the refrigeration art, and more particularly to a novel food merchandiser especially adapted for low temperature refrigeration of frozen food products.

In the past many food merchandiser have been provided for products requiring higher temperature refrigeration, such as dairy products or the like, and for products requiring low temperature refrigeration such as frozen food products. For purposes of disclosure "high temperature refrigeration" will refer to cooling temperatures above the freezing point of water and particularly about 38° Fahrenheit, and "low temperature refrigeration" will refer to temperatures below the freezing point of water and generally around 0° Fahrenheit.

However, heretofore it has not been practical to display frozen merchandise on vertically-spaced accessible shelves so that this merchandise was easily seen and reached by the consumer without also providing doors or glass barriers at the front edges of the shelves to maintain the temperatures of the merchandiser below freezing. As a result, the low temperature refrigeration equipment, particularly for self-service markets, has generally been limited to refrigerated cases having deep wells in which food products were stacked, and the tops of such cases are most frequently provided with sliding covers. Manifestly, deep well type cases are not completely acceptable to consumers who must reach over and into the well to obtain products and frequently must hunt for the kind of product desired as these cannot be easily seen. Deep well type cases also require a large amount of floor space and require frequent defrosting and attention.

The principal object of the present invention is to provide a food merchandiser having a plurality of shelves for vertically displaying frozen food products, the merchandiser being efficient in operation for maintaining the display area thereof below freezing temperatures.

Another object is to provide an open front food merchandiser having a plurality of vertically spaced shelves on which frozen food products may be arranged for optimum access and sight as well as utilization of space.

Still another object is to provide a food merchandiser for maintaining low temperatures in a relatively large display area, for minimizing intermixture of room temperature air and refrigerated air and for providing recirculation of the refrigerated air to obtain optimum cooling and efficiency of the merchandiser.

A still further object is to provide an improved food merchandiser maintaining freezing temperatures in the display area in which a plurality of shelves are adjustably positioned and substantially evenly cooled.

Another object is to provide an efficient and simple food merchandiser using a minimum of floor space and providing a large display area for displaying frozen foods that can be seen and reached without bending over, and having no doors or other closing means preventing easy accessibility to the display area.

It is also an object to provide an open front frozen food merchandiser having controlled forced air circulation substantially eliminating condensation within the display area thereof. It is a further object to substantially reduce condensation on evaporator coils of a low temperature refrigeration system of the merchandiser.

These and still other objects and advantages will become apparent hereinafter.

Briefly, the invention comprises a food merchandiser having a display area with an open front, first air circulating and cooling means for passing low temperature refrigerated air through the display area, and second air circulating and cooling means for establishing a refrigerated air wall in front of the low temperature air circulated by the first means and for reducing intermixture of ambient warmer air with the refrigerated air currents. The invention also consists in a novel refrigeration system for controlled cooling and defrosting whereby the air wall is maintained operative to efficiently absorb moisture and minimize migration thereof into the display area and low temperature air means.

Figure 2:
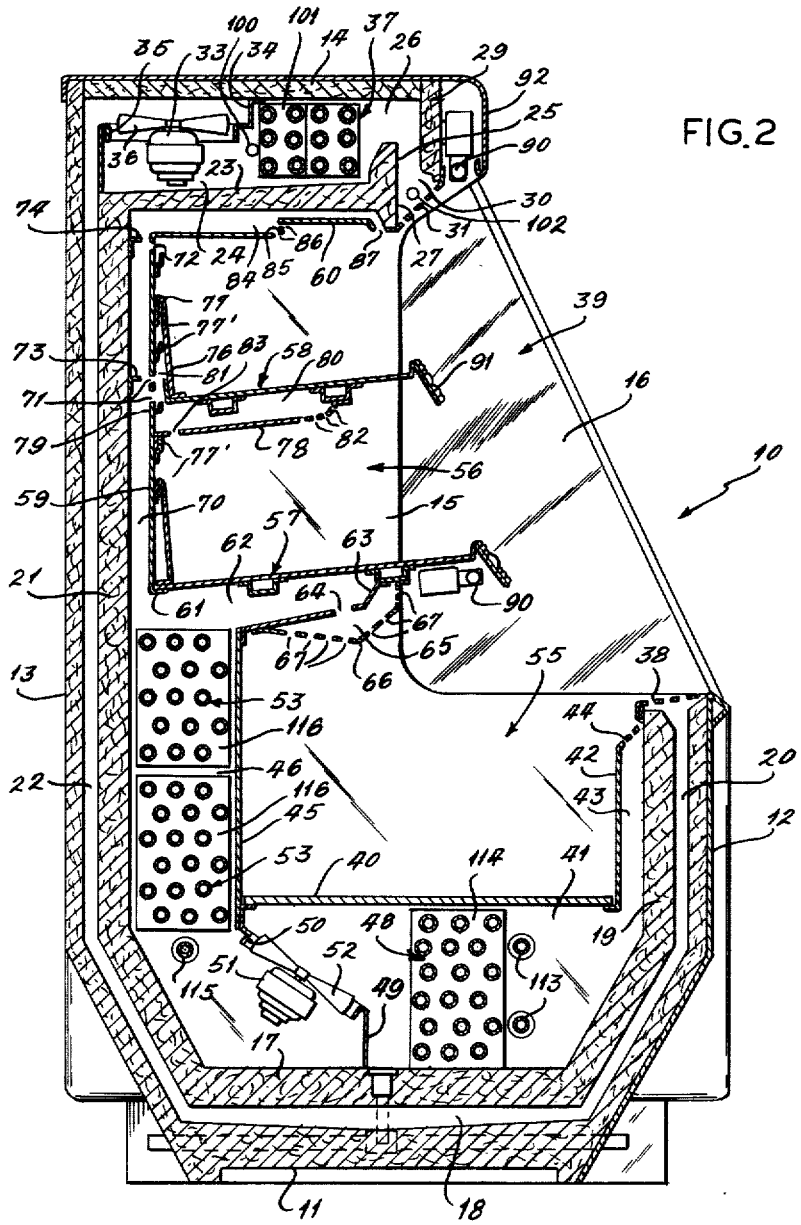

The invention also consists in the parts and in the arrangements and combinations of parts hereinafter described and claimed. In the accompanying drawing which forms a part of this specification and wherein like numerals refer to like parts wherever they occur:

FIG. 1 is a front elevational view, partly broken away, of a food merchandiser embodying the present invention, FIG. 2 is a vertical transverse sectional view taken substantially through the center of FIG. 1, and FIG. 3 is a diagrammatic view showing refrigeration systems for a display case embodying the present invention.

This is a continuation-in-part of co-pending application Serial No. 68,308 filed November 9, 1960, now Pat. No. 3,063,254, for Food Merchandiser.

Referring now to the drawings, a food merchandiser 10 embodying the present invention includes an insulated outer cabinet having a base 11, a low front wall 12, a high rear wall 13, a top wall 14 extending forwardly from the rear wall 13 and end walls 15. Each end wall 15 has a forwardly extending transparent panel 16, and the front of the frozen food merchandiser 10 is open between the front wall 12 and top wall 14 for direct accessibility to the interior of the merchandiser.

Positioned within the outer cabinet and extending longitudinally between the end walls 15 thereof is an intermediate insulated cabinet which includes a bottom wall 17 in spaced relation with the base 11 to provide a bottom flue 18, a front wall 19 spaced from the low front wall 12 to provide a front flue or return duct 20 in communication with the bottom flue 18, a rear wall 21 spaced from the back or rear wall 13 to provide a rear flue 22 also in communication with the bottom flue 18, and a short top wall 23 spaced below the top wall 14 and defining a refrigeration chamber 24 therebetween. In FIG. 2 it will be seen that the wall 23 slopes downwardly toward the rear wall 13 for a purpose to be set out hereinafter. The forward end of the top wall 23 has an upwardly projecting member 25 extending toward the top wall 14 for forming a restricted opening 26 therebetween, and a lower member 27 extends downwardly from the top wall 23. The top wall 14 of the outer cabinet has a short vertical front wall 29 extending downwardly therefrom in spaced relation with the top wall 23 and members 25 and 27 to form a discharge chamber 30 therebetween, a perforated plate 31 being provided between the wall 14 and the lower member 27 through which refrigerated air is discharged, as will also be more fully set out hereinafter. The plate 31 is angularly positioned in a plane substantially perpendicular to the path of air flow desired.

The refrigeration chamber 24 houses a fan 33 or similar air circulating means and the chamber 24 is divided by a partition 34 extending between the rear wall 21 and the top wall 14, the partition having an opening 35 in which the fan blade 36 is mounted for efficiently moving air through the refrigeration chamber to the discharge plate 31 and across the open front of the merchandiser to the return duct 20. The chamber 24 preferably houses an evaporator coil 37 or like cooling means of a closed refrigeration system, FIG. 3, the evaporator coil 37 being shown positioned forwardly of the fan 33 and extending longitudinally of the merchandiser 10 for cooling the air forming a wall across the open front thereof.

The return duct 20, bottom and rear flues 18 and 22, refrigeration chamber 24 and discharge member 30 form an air cooling and circulatory system for continuously recirculating refrigerated air. This refrigeration system will hereinafter be referred to as a "secondary" system inasmuch as the wall of air merely defines the front of the merchandiser 10 and does not directly cool food products therein. The coil 37 is adapted to cool air at least to the higher refrigeration temperatures, and the fan 33 is adapted to create a negative pressure through the rear, bottom and front flues to draw previously cooled air into the front flue 30 and to force refrigerated air of the secondary system out of the discharge chamber 30 and across the merchandiser 10. As previously stated, this secondary air forms a refrigerated air wall extending between the perforated plate 31 at the discharge and a perforated plate 38 covering the return duct 20.

The food merchandiser 10 also includes an inner cabinet defining a display area 39 in which frozen food products are positioned for refrigeration. The inner cabinet also extends longitudinally between the end walls 15 of the outer cabinet and includes a bottom plate or wall 40 spaced above the bottom wall 17 of the intermediate cabinet to form a refrigeration chamber 41 for a primary refrigeration system. A front panel 42 is spaced from the front wall 19 of the intermediate cabinet and provides a cold air return flue or duct 43 therebetween, the panel 42 having an angularly-positioned perforated end portion 44 secured to the front wall 19. The end member 44 forms a return or inlet for the front flue 43. The inner cabinet also includes a lower rear panel 45 spaced forwardly from the rear wall 21 of the intermediate cabinet and defining an auxiliary refrigeration chamber 46 therebetween.

The return flue 43 is in communication with the refrigeration chamber 41, which houses an evaporator coil 48 extending longitudinally of the merchandiser 10. The refrigeration chamber 41 is divided by a partition 49 having an opening 50 therein, and a fan 51 or like air circulating means is mounted in the chamber with its blade 52 positioned in the opening, more than one fan 51 may be provided if desired, as shown in FIG. 3. The auxiliary chamber 46 is in communication with the refrigeration chamber 41 through the fan blade opening 50, and the auxiliary chamber houses auxiliary cooling coils 53 through which air is forced by the fan 51. The coils 48 and 53 may be part of a single closed refrigeration system, FIG. 3, and the coils 48 and 53 are positioned on opposite sides of the fan 51, as shown in FIG. 2.

Still referring to FIG. 2, it is clearly shown that the chambers 41 and 46 together form an L-shaped main refrigeration chamber positioned at the bottom and rear of the display case 10 and having inlet and outlet ends in communication with the air return flue 43 and air delivery ducts 62 and 70, respectively. Inasmuch as the coils 48 and 53 may be connected in a single closed refrigeration system, the first evaporator section 48 adjacent to the inlet end and second evaporator section 53 adjacent to the outlet end will be provided with a common refrigerant coil arranged to provide the second evaporator section 53 with lower temperatures relative to the temperatures of the first evaporator section 48 in order that the air temperature is further lowered as the air passes through the second section 53 as set out hereinafter. It will be noted that the partition 49 forms a supporting plate for mounting the fan or blower 51 in the opening 50, and that the partition extends from the plate 40 to the wall 17 so that all of the air circulated in the chamber is drawn through the first evaporator section 48 by the fan and discharged through the second evaporator section 53. The fan blade 52 is shown in an angular position, more nearly horizontal than vertical, for directing air in a downward path toward the wall 17 and producing a more uniform dispersion of air through evaporator 53 than when the fan is in a more vertical position.

It is now apparent that air is drawn into the return flue 43 by the negative pressure developed by the fan 51 and passed through the coils 48, and is then forced upwardly through the auxiliary coils 53 whereby the air is refrigerated to the low temperatures required for maintaining food products in frozen condition. This refrigeration system is a portion of a "primary" system for providing low temperature refrigerated air directly to food products in the display area.

The bottom plate 40 and front and rear panels 42 and 45 of the inner cabinet and the end wall 15 of the outer cabinet define a lower portion or well 55 of the display area 39 in which food products may be positioned in a conventional manner. The display area 39 also includes an upper portion 56 which may be provided with lower and upper shelves 57 and 58, respectively. The upper portion 56 also extends between the end walls 15 of the outer cabinet and is delimited at the rear by an upper rear panel 59 and at the top by a top panel 60.

The lower end 61 of the upper rear panel 59 is preferably spaced above the upper end of the lower rear panel 45, and the lower shelf 57 may be secured to the lower end 61 of the panel 59 and extend forwardly therefrom. A forwardly extending chamber 62 is provided below the lower shelf 57, the chamber 62 having a bottom and front forming wall 63 secured to the lower surface of the shelf 57 and to the upper end of the lower rear panel 45. The chamber 62 is in communication with the auxiliary refrigeration chamber 46 and the chamber wall 63 has an aperture 64 through which refrigerated air from the auxiliary coils 53 is expelled into an outlet chamber 65 defined by a plate 66 having perforations 67. The refrigerated air passes through the perforated plate 66 from the chamber 65 and is drawn across the top of the well 55 toward the return inlet plate 44 of the front flue 43 of the primary refrigeration system. Manifestly, the low temperature air will tend to fall into the well whereby food products therein are kept at low temperatures. However, the velocity at which air is expelled through the perforated plate 66 provides a forwardly moving air current to be formed against the lower surface of the shelf 57 to the front edge thereof.

The upper rear panel 59 is spaced from the rear wall 21 of the intermediate cabinet by suitable means (not shown) to provide a rear cold air delivery flue or duct 70 therebetween, the duct 70 being in communication with the auxiliary refrigeration chamber 46 and the chamber 62 and receiving a stream of low temperature air from the former. As shown in FIG. 2, the rear panel 59 is offset relative to the vertical plane of the panel 45 so that the rear duct 70 is directly in communication with a portion of the chamber 46, the rearward portion of the lower shelf 57 overhanging the refrigeration chamber 46 and acting as a baffle for deflecting a portion of the air stream from the chamber 46 into the chamber 62.

The upper rear panel 59 is provided with lower air outlet openings 71 and with upper air outlet openings 72, and lower and upper baffles 73 and 74 are positioned in the rear duct 70 and secured to the wall 21 for deflecting a portion of the primary air stream through the openings 71 and 72.

The upper shelf 58 is adjustably mounted on the rear panel 59 and extends forwardly therefrom into the upper portion 56 of the display area 39. In FIG. 2 it will be seen that each shelf 57 and 58 is angularly positioned relative to horizontal and has a back plate 76 secured at substantially right angles thereto so that the plates 76 are angularly positioned relative to the rear panel 59. This shelf means is especially adapted to receive frozen food packages thereon and prevents them from falling off the front edge of the shelf. The upper edge 77 of the plate 76 of the upper shelf 58 is adapted to be removably and adjustably interlocked with the upper rear panel 59 in any suitable manner, such as by locking means 77'. A channel defining member or wall 78 is secured to the lower surface of the shelf 58 adjacent to the front edge thereof and extends rearwardly, the rearward edge 79 of the wall 78 being provided with locking means 77' for removably interlocking the wall with the rear panel 59. Accordingly, the shelf 58 is supported on the rear panel 59 and may be adjusted thereon. The wall 78 is spaced below the shelf 58 and defines a forwardly extending chamber 80 in communication with a vertically extending chamber 81 between the angular plate 76 and the rear panel 59, and the lower openings 71 are formed in the panel in position to provide communication from the rear air delivery duct 70 to these chambers 80 and 81 regardless of the vertical adjustment of the upper shelf 58. The chamber wall 78 has perforations 82 at its forward end through which refrigerated air of the primary stream is discharged in a forwardly moving path toward the front of the shelf 58 and adjacent to the lower surface thereof. This stream of air then flows downwardly across the front of the lower shelf 57 toward the cold air return or inlet 44. The chamber wall 78 also has perforations 83 adjacent to the rearward edge 79 through which low temperature refrigerated air is discharged onto the lower shelf 57 for maintaining food products thereon in frozen condition.

The top panel 60 delimiting the top of the display area 39 is spaced below the top wall 23 of the intermediate cabinet and provides a forwardly extending discharge flue or duct 84. The top panel 60 is secured to the rear panel 59 above the openings 72 through which a portion of air is deflected by baffle 74, but most of the air is pushed forwardly into the duct 84. The top panel 60 is stepped longitudinally intermediate its front and rear edges to provide a vertical wall 85 which has apertures 86 through which a portion of the remaining air stream is expelled into thte display area 39. The forward edge of the panel 60 is spaced away from the lower member 27 of the intermediate cabinet and defines an angularly positioned discharge flue 87 therebetween through which the remaining portion of the primary low temperature air stream is discharged.

Referring now to FIG. 3, separate refrigeration systems 88 and 89 are provided for the high refrigeration temperature secondary air system and for the low refrigeration temperature primary air system, respectively. The secondary refrigeration system 88 comprises a condensing unit 95 including a compressor 96, a liquid line 97, the evaporator means 37 connected to the liquid line 97 through an expansion valve 98, and a gas return or suction line 99. The liquid and suction lines 97 and 99 may be arranged to form a heat exchanger (not shown) in a typical manner. A defrost heater 100 may be provided on the leading edges of the fins 101 of evaporator 37, FIG. 2, and a small heater 102 may also be provided in the discharge chamber 30 from which the high temperature air wall is formed, as will be described more fully hereinafter.

Control means 103, such as a reverse acting relay or the like, are provided for controlling the operation of the refrigeration system 88 to maintain the coil 37 between preselected maximum and minimum temperatures. The suction line 99 is connected by a sensing element 104 to the control means, the latter being responsive to the pressure of the refrigerant to initiate a defrost cycle of the evaporator 37 by stopping the compressor 96 and completing a circuit to the electrical defrost heater 100. The control means 103 also terminates a defrost cycle by actuating the compressor and breaking the circuit to the defrost heater 100, and the refrigeration system 88 continues to cycle between cooling and defrost periods throughout the operation of the display case 10, as will be more fully described. However, the fan 33, 36 continues to operate at all times during both cooling and defrost periods.

The primary refrigeration system 89 comprises a condensing unit 107 including a compressor 108, a liquid refrigerant line 109, the evaporators 48 and 53, and a gas return or suction line 110. The evaporators 48, 53 are connected in parallel refrigerant flow to the liquid line 109 through branch conduits 111 and expansion valves 112. The liquid and suction lines 109 and 110 may be coupled in a typical manner to form a heat exchanger (not shown). Defrost heaters 113 are positioned on the fins 114 of the evaporator 48 and a defrost heater 115 is positioned on the fins 116 of the evaporator 53, and these heaters 113, 115 are adapted to periodically defrost the evaporators during the operation of the case 10.

Control means 117 are also provided for controlling the operation of the primary refrigeration system 89, including timing means 118 for initiating a defrost cycle and a refrigerant pressure sensing element 119 for terminating each defrost cycle or period. Accordingly, the low temperature coils 48, 53 will cool air for predetermined time intervals of optimum duration, such as six, twelve or twenty-four hours, and the timer 118 will then stop the operation of the condensing unit 107 and complete a circuit to energize the electrical defrost heaters 113, 115. When the pressure of the refrigerant rises to a preselected value indicating a temperature that will assure a complete coil defrost, the sensing element 119 will terminate the defrost and reset the timer 118 so that full case operation is resumed.

In the operation of the merchandiser 10, the primary system and the secondary system cooperate to provide low temperatures in the display area 39 for keeping food products in frozen condition and for providing a cold front or wall of refrigerated air obviating the necessity for doors or glass panels across the front of the merchandiser shelves or a glass retaining wall or barrier extending above the low front wall 12 of the outer cabinet. The two systems also reduce to a minimum the amount of ambient room temperature air that becomes intermixed with the refrigerated front wall of air so that the merchandiser can operate efficiently and perform its function of providing low temperatures for frozen food products. In addition, moisture is substantially eliminated from the display area 39 so that condensation on the walls of the merchandiser 10 and the food products is minimized; and condensation, and consequent frosting, is substantially reduced on the evaporator coils 48 and 53 of the primary system.

In the operation of the primary system, the fan or fans 51, 52 draw cold air into the return duct 43 from the display area 39 and past the refrigeration coil 48, and pushes this refrigerated air through the coils 53 in the auxiliary chamber 46 so that the temperature of the air is lowered to the required degree of coldness. The primary air stream forced through the coils 53 is divided and a portion of the air passed into the rear delivery duct 70 and another portion of the air is deflected forwardly in the chamber 62, through the opening 64 into the discharge chamber 65 and forwardly and downwardly through the perforations 67 toward the return duct 43. Thus, the lower portion 55 of the display area is cooled and the forward direction of the air discharged from the chamber 65 assists in supporting the front wall of air of the secondary system.

The portion of air forced upwardly into the rear duct 70 is further divided by the baffles 73 and 74 into three streams, the lower stream passing through openings 71 into chambers 80 and 81 under the upper shelf 58 and outwardly through perforations 82 and 83 for cooling the lower shelf 57 and assisting in supporting the front wall of air to prevent turbulence and intermixture of ambient air therewith. The second stream of air from the rear duct 70 is discharged through upper openings 72 into the display area above the upper shelf 58, and the remaining or uppermost stream of air is deflected by baffle 74 into the forwardly extending top duct 84. The latter stream is further divided, a portion thereof passing through apertures 86 in a forwardly directed path along the top panel 60 toward the discharge flue 87, and the remainder of the low temperature primary air stream being discharged through the angularly positioned discharge flue 87 and forming a wall of low temperature air in front of the shelves 57 and 58. The air passing in front of the shelves is directed downwardly toward the return duct 43 in the front wall of the mechandiser 10 and is returned to the primary system for further refrigeration and recirculation.

The forward flow of air beneath each shelf 57 and 58 and the top wall 23 has a velocity that will cause the air to move substantially parallel to the shelves and top wall until these air streams merge with the downwardly moving primary air wall. Inasmuch as low temperature air will naturally tend to fall, the forwardly moving path of air is provided beneath each shelf to prevent the front wall of air from being drawn inwardly or rearwardly at these areas thereby causing a turbulence that would cause intermixture of ambient air with the cold front wall of the merchandiser 10.

In the operation of the secondary system, refrigerated air is drawn into the front flue 20, across the bottom flue 18 and upwardly in the rear flue 22 to the refrigeration chamber 24. This air is pushed by the fan 33 through the coil 37 and outwardly and downwardly through the discharge chamber 30. The air of the secondary system is expelled through the perforated plate 31 in a direction toward the cold air return flue 38 and forms a wall or stratum of air in front of the wall of low temperature air moving downwardly between the discharge opening 87 in the top panel 60 and the return duct 43.

The wall of secondary air across the front of the merchandiser 10 has a temperature higher than the low temperature air wall discharged through the flue 87, preferably in the range of higher refrigeration temperatures. The secondary air wall moves more slowly across the front of the merchandiser than the low temperature or primary wall, but in a direction substantially parallel therewith. Accordingly, intermixture between the two walls of air is minimized, and the intermixture of ambient room temperature air with the secondary air wall and aspiration of room air into the display area is also minimized.

During operation of the refrigeration system 88 for the high refrigeration temperature air wall, which is continuously formed by the continuously operating air moving means 33, 36, the air forming the air wall is cooled by the low temperature air from the display area or second wall of air and also picks up moisture from the ambient room air, which air may otherwise have migrated into the colder display area due to the vapor pressure differential. This air from the air wall is recycled and passes through the coil 37, which normally will operate between 5° to 40° in order to produce the air wall temperatures. The moisture in the recycled air is condensed by the coil 37 and the air is then passed through the discharge chamber 30 where the heater 102 will reheat the air a few degrees as it is discharged to form an air wall that is relatively dry and will absorb a high degree of moisture as it flows across the open front of the case 10. However, during the operation of the refrigeration system 88, the coil temperature and refrigerant pressure will drop by the continued presence of cool air and the accumulation of frost on the coil 37 and therefore will require defrosting of the secondary refrigeration system coil.

Accordingly, when the refrigerant pressure reaches a predetermined value, the sensing element 104 will shut off the condensing unit 95 and energize the heater 100 to defrost the coil 37, the moisture being drained off through the rear flue 22. During this defrost period, the fan 33, 36 continues to form the air wall which will have a cool temperature by reason of conduction from the low temperature primary system, and this air will approach moisture saturation except for the reheating of air by the heater 102 to increase the moisture capacity thereof at the point of discharge from the chamber 30.

The primary refrigeration system 89 operates for the time interval preset by the timer 118, during which period cyclic operation of the secondary refrigeration system 88 takes place. When the timer 118 times out and a case defrost is initiated to remove frost accumulations from the evaporators 48 and 53, the fans 51, 52 continue to operate to circulate air through the evaporators in order to increase the speed of defrosting. However, during this defrost period of the primary system, the secondary refrigeration system 88 continues to operate by reason of the higher air temperatures in the display area which keeps the air wall temperature up and maintains a heat load on the coil 37 so that the refrigerant temperature and pressure do not drop to the required value to defrost the coil 37. Accordingly, the air wall is maintained relatively dry and cool for efficiently preventing heat and moisture migration from the ambient room air into the case 10, thereby protecting the product. When the primary refrigeration system 89 is returned to operation, the secondary system 88 will return to its normal cyclic operation.

The present merchandiser is efficient in operation and provides a much larger, more accessible shelf space or display area for displaying frozen food products than has been known heretofore and, in addition, the upper surface of the top wall 14 of the merchandiser may be used as an unrefrigerated shelf or storage space. The merchandiser 10 is provided with lamps 90 for lighting the display area 39, the price tag mouldings 91 or the like may be provided on the front edge of the shelves 57 and 58 for identifying goods or the cost thereof. It is also within the scope of the present invention to provide additional shelves, if desired, and to make all of the shelves adjustable vertically in the display area. A decorative display panel 92 is provided in front of the vertical wall 29 at the top wall 14, and one of the lamps 90 may be positioned behind this panel.

It is to be understood that the foregoing description and accompanying drawing have been given only by way of illustration and example, and that changes and modifications in the present disclosure, which will be readily apparent to all skilled in the art, are contemplated as within the scope of the present invention, which is limited only by the claims which follow.

What we claim is:

1. In a refrigerated display case having a display area with an open front, first means for cooling said display area including an evaporator, defrost means for periodically defrosting said evaporator, and second means forming a wall of refrigerated air across the open front of the display area in heat relationship therewith, the combination of means for recycling air from said wall of refrigerated air, air cooling means for cooling said recycled air, and control means responsive to a heat load imposed on said air cooling means by said recycled air during defrosting of said evaporator for continuously operating said air cooling means during the defrosting of said evaporator.

2. In a refrigerated display case having an open front display area cooled to low refrigeration temperatures, the combination of means forming a refrigerated air wall across the open front of said display area, and heater means positioned in the flow path of air forming said air wall for raising the temperature of said air to increase the moisture retention characteristics of said air wall.

3. In a refrigerated display case having a display area with an open front, first means for cooling said display area, second means discharging an air wall of refrigerated air across said open front of said display area, the combination of air cooling means for cooling and dehumidifying air for said air wall, and heater means adjacent the discharge point of said air wall and positioned directly in the flow thereof for raising the temperature of said air to increase the moisture absorption characteristics thereof.

4. In a refrigerated display case having a display area with an open front, means for producing low refrigeration temperatures in said display area, means forming a downwardly moving air curtain across the open front including a passage having an opening through which air is discharged to form said air curtain, means for cooling said air to high refrigeration temperatures prior to discharge thereof from said passage, and heater means centrally disposed in said passage in the flow path of said air to increase moisture retention characteristics of said air curtain at temperatures within the range of high refrigeration temperatures.

5. In a refrigerated display case having a vertical display area with an open front, first means for producing low refrigeration temperatures in said display area, said first means including a primary refrigeration system having evaporator means adapted to operate at low refrigeration temperatures for a predetermined time period followed by a defrost period, means actuated at the end of a defrost period for initiating another operative time period, second means for producing an air wall across said front opening in contiguous, heat exchange relation with said display case, said second means including a secondary refrigeration system having second evaporator means for cooling air forming said air wall to high refrigeration temperatures, means for recycling air of said air wall through said second evaporator means, control means for effecting cyclic cooling and defrost periods of said second evaporator means in response to upper and lower refrigerant values, respectively, and said refrigerant being maintained above said lower value thereof by the temperature of air from said air wall recycled over said second evaporator means during defrost periods of said primary refrigeration system.

6. In a refrigerated display case having a display area with an open front, a first air cooling and circulation system for inducing low refrigeration temperatures in said display area including first air moving means adapted for continuous operation, a first refrigeration system having first evaporator means adapted for low temperature operation, defrosting means for said first evaporator means, timing means for operating said first refrigeration system for preselected time intervals and initiating a defrost period at the termination of each time interval, and means responsive to predetermined refrigerant characteristics for terminating each defrost period and resetting said timing means for operation of said first refrigeration system during another time interval; and a second air cooling and circulation system for producing an air wall across the open front of said display area and recycling the air therefrom including second air moving means adapted for continuous operation, a second refrigeration system having second evaporator means adapted for high refrigeration temperature operation, and control means responsive to predetermined refrigerant characteristics for terminating and initiating defrost cycles of said second evaporator means, said air wall and said display area air being in heat exchange relation whereby said air wall temperature is lowered during said time intervals of said first refrigeration system and is raised during defrost periods of said first evaporator means, and said recycled air from said air wall imposing a heat load on said second evaporator means during said defrost periods of said first evaporator means affecting the refrigerant characteristics of the second refrigeration system thereby preventing operation of said control means and providing continuous operation of said second refrigeration system during the defrost periods of said primary refrigeration system.

7. The method of refrigerating a product zone having an open front side, comprising the steps of forming an air wall across the open front side of said product zone, distributing other air throughout said product zone, cooling said other air to low refrigeration temperatures for preselected time intervals, defrosting the means for cooling said other air intermediate said time intervals, and continuously cooling said air wall to high refrigeration temperatures during defrosting of said means for cooling said other air.

8. The method of refrigerating a product zone having an open front side, comprising the steps of forming an air wall across the open front side of said product zone, distributing other air throughout said product zone, cooling said other air to low refrigeration temperatures for preselected time intervals, defrosting the means for cooling said other air intermediate said time intervals, cyclically cooling and dehumidifying air for said air wall during said time intervals for cooling said other air, and continuously cooling the air for said air wall during defrosting of said means for cooling said other air.

References Cited in the file of this patent
UNITED STATES PATENTS

| | | |
|---|---|---|
| 2,430,329 | Davis | Nov. 4, 1947 |
| 2,810,267 | Reuter | Oct. 22, 1957 |
| 2,836,039 | Weber | May 27, 1958 |
| 2,984,085 | Rainwater | May 16, 1961 |

UNITED STATES PATENT OFFICE

CERTIFICATE OF CORRECTION

Patent No. 3,091,942

June 4, 1963

Edgar V. Dickson et al.

It is hereby certified that error appears in the above numbered patent requiring correction and that the said Letters Patent should read as corrected below.

Column 1, line 13, for "merchandiser" read -- merchandisers --; column 8, line 56, after "heat" insert -- exchange --; column 9, line 4, after "flow" insert -- path --; line 29, for "case" read -- area --.

Signed and sealed this 31st day of December 1963.

(SEAL)
Attest:
ERNEST W. SWIDER

Attesting Officer

EDWIN L. REYNOLDS

Commissioner of Patents